United States Patent [19]
Butwell et al.

[11] Patent Number: 5,532,462
[45] Date of Patent: Jul. 2, 1996

[54] METHOD OF AND APPARATUS FOR HEATING A REACTION VESSEL WITH MICROWAVE ENERGY

[75] Inventors: Robert J. Butwell, Redwood City; Earl McCune, San Jose; Michael Green, Palo Alto; Hugo Huey, Cupertino; James R. Legarra, Redwood City; Ross Wilcox, Palo Alto, all of Calif.

[73] Assignee: Communications & Power Industries, Palo Alto, Calif.

[21] Appl. No.: 236,759

[22] Filed: Apr. 29, 1994

[51] Int. Cl.⁶ .................................................. H05B 6/70
[52] U.S. Cl. .................... 219/695; 219/696; 219/748; 219/750; 219/759
[58] Field of Search .................................. 219/695, 696, 219/746, 747, 748, 750, 759, 756

[56] References Cited

U.S. PATENT DOCUMENTS

| | | | |
|---|---|---|---|
| 4,020,311 | 4/1977 | Churchland | 219/695 |
| 4,371,769 | 2/1983 | Yoshimura et al. | 219/746 |
| 4,423,303 | 12/1983 | Hirose et al. | 219/121 |
| 4,835,354 | 5/1989 | Collins et al. | 219/746 |
| 4,882,128 | 11/1989 | Hukvari et al. | 422/119 |
| 4,992,763 | 2/1991 | Bert et al. | 333/219 |
| 5,008,506 | 4/1991 | Asmussen et al. | 219/696 |
| 5,030,929 | 7/1991 | Moeller | 333/21 R |
| 5,069,928 | 12/1991 | Echizen et al. | 219/696 |
| 5,122,633 | 6/1992 | Moshammer et al. | 219/10.55 |
| 5,228,947 | 7/1993 | Churchland | 219/750 |

FOREIGN PATENT DOCUMENTS

| | | | |
|---|---|---|---|
| 1-14888 | 1/1989 | Japan | 219/746 |

*Primary Examiner*—Philip H. Leung
*Attorney, Agent, or Firm*—Lowe, Price, LeBlanc & Becker

[57] ABSTRACT

A reaction vessel used in industrial applications is heated by a multiple mode microwave beam that is directed to an interior wall of the reaction vessel. The beam is in an inclined-angular fashion and the wall is arranged so the beam is absorbed and reflected from it many times to provide a helical-like reflection and absorption pattern within the vessel interior to uniformly heat the vessel wall and the material. A microwave isolator connected between a source of the microwave energy and the reaction vessel includes a quartz plate and a seal for compensating disparities in thermal expansion coefficients between the plate and a housing for the plate.

52 Claims, 7 Drawing Sheets

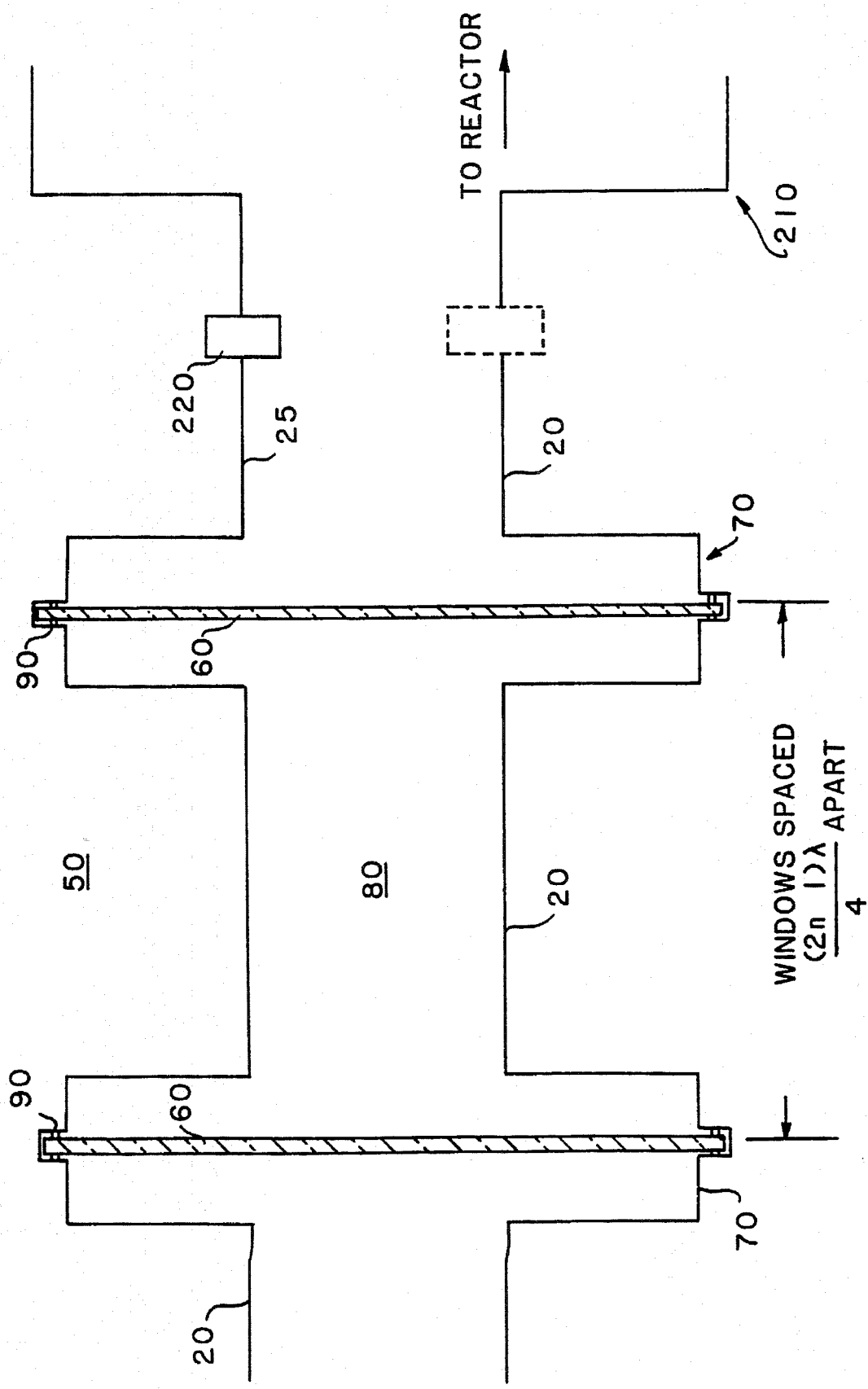

METHOD OF AND APPARATUS FOR HEATING A REACTION VESSEL WITH MICROWAVE ENERGY

FIELD OF THE INVENTION

This invention relates to an improved method of and apparatus for providing an even distribution of microwave energy within a closed environment. In particular, it relates to an improved waveguide applicator for use in providing an even distribution of heat to a reaction vessel.

BACKGROUND OF THE INVENTION

In the chemical industry brick and/or ceramic-lined vessels are generally utilized to provide a means in which materials are mixed, and chemical reactions or other processes are carried out, to produce intermediate and final chemical products. Such a vessel, used for example to contain reagents undergoing a chemical reaction, generally comprises a metal casing with an internal ceramic lining. The vessels are of differing sizes and shapes, depending on specific operational parameters, but typically are cylindrical and of the order of three feet or greater in diameter and ten feet or more in length. The vessels are specially designed to incorporate apertures for ingress of the reagents and egress of the final reaction products. The outer metal casing is usually steel, nickel or an alloy thereof, or other suitable material selected for both durability and corrosion resistance. The internal lining is usually glass or other ceramic material (example; silica, magnesia or alumina, or similar heat and chemical resistant material). In large size reactors the ceramic lining is frequently fabricated of bricks, chosen for thermal insulation and for resistance to attack by the chemical species present in the vessel. An inner lining of ceramic layer, which contacts the reaction mixture usually has the same composition as the brick material, or may be a different composition chosen primarily on the basis of its compatibility with the reaction mixture. For example, the inner lining may be carbon or carbon bricks for improved resistance to chemical attack, wherein thermal insulation is furnished mainly by the interlayer of ceramic bricks between the carbon-loaded lining of the bricks and the outer metal wall. Typically in these designs at least one access port is provided in the vessel wall for maintenance purposes.

Reaction vessels similar to those described above are generally used to contain and control industrial scale chemical reactions. Frequently these reactions must be carried out at elevated temperatures to obtain a good yield for the desired product. Since the reaction vessel has considerable mass, it must be preheated to its operating temperature over a period of hours before admitting the reagents and initiating the desired reaction. If the reaction is interrupted or temporarily shut down and the reactor cools, the preheating process must often be repeated before the reaction can be restarted in a satisfactory manner. This heating process often generates combustion products and effluents which are environmentally undesirable.

An example of such a reaction is an organic chemical feedstock operating at high temperature to carry out the synthesis of a value added product. These reactions sometimes involve particularly severe conditions, and have a high likelihood of unwanted side products, thereby creating a disposal problem if the reaction conditions are not well controlled. In this context the reactor temperature is an extremely important process variable.

In many cases conventional heating by, for example, the burning of a mixture of natural gas and air within the reaction vessel, is not practical because the interior of the reaction vessel must be kept free from water, one of the by-products of the combustion of natural gas. In addition, if the reactor vessel happens to contain a combustible lining, for example carbon bricks, air or oxygen based combustion within the reactor is likely to erode the lining by oxidation to CO and $CO_2$.

One prior art method is to use the production reaction itself as a means to preheat the vessel to its correct operating temperature. However, because of the relatively expensive organic feedstock which is consumed under the non-optimum conditions, this procedure has several disadvantages, as well as being cost prohibitive. Additionally, undesired side reactions may form side products during such a heating process, while the reactor is coming up to its final temperature but is still cooler than the optimum temperature. These produced side products, if formed, must be disposed of at a considerable cost in addition to the expense incurred as a result of the feedstock consumed.

Another prior art method is the chlorinating of an inexpensive hydrocarbon, for example methane. This reaction forms carbon tetrachloride and hydrogen chloride which in the past were two compounds that were classified as low value but saleable products. However, in view of the regulatory situation that has changed, carbon tetrachloride itself has been listed as a Class II substance under the 1989 Montreal Protocol and will undergo stepwise phase out to 85 percent of non-CFC feedstock use by Jan. 1, 1995 and total phase out by Jan. 1, 2000. Although carbon tetrachloride produced in the above manner may be exempt under various regulatory provisions, the regulatory situation may become more stringent. Therefore the elimination of a process dependent on carbon tetrachloride reaction is highly desirable, and use of microwave heating as a substitute heating means would constitute a significant improvement.

It is therefore an object of the present invention to provide a means of utilizing electrically generated microwave energy for the heating of reaction vessels, which avoids the formation of environmentally undesirable compounds, as well as the consumption of expensive chemical feedstock used as a heating fuel.

It is a feature of the present invention to provide a uniform distribution of microwave energy, in a whispering gallery mode of energy propagation, throughout the vessel, thereby avoiding the formation of local regions of high field intensity and hot spot formation resulting therefrom.

It is a further feature of the present invention to provide an applicator window which causes minimal reflection or absorption of microwave energy, while still maintaining its structural integrity while exposed to heat transfer and chemical attack from the species present in the chemical vessel.

SUMMARY OF THE INVENTION

To attain the foregoing objects, a waveguide and applicator system according to the present invention is provided which is mounted to a reaction vessel at a tangential incline to the vessel's lateral axis. Microwave energy launched from the applicator at one side of the vessel, penetrates through the ceramic lining of the vessel at an opposite side, and undergoes an internal reflection upon impinging the interior of the metal shell of the reactor; propagating back through a different section of the ceramic as a result of the reflection angle, re-emerging in the vessel's interior where it again penetrates the ceramic lining at an opposed location within the vessel. The microwaves continue to penetrate, emerge and re-penetrate the ceramic lining in this "whispering gallery" type mode, creating in effect a helical, upwardly propagating vortex of microwave energy to evenly distribute the energy throughout the ceramic lining, where it is partially absorbed, resulting in a uniform heating of the reaction vessel. To accomplish the transfer of microwave energy to the reaction vessel, the invention further utilizes a unique waveguide window, which isolates the microwave from the hostile contents of the reaction vessel, while transmitting microwaves efficiently with minimal reflection or absorption, resulting in a faster and more uniform heating of the vessel, while minimizing the environmental impact of the heating process.

DETAILED DESCRIPTION OF THE DRAWINGS

The present invention will now be described in detail with reference to the accompanying drawings in which;

FIG. 3 is a close up view of the waveguide window configuration of the present invention.

DETAILED DESCRIPTION OF THE INVENTION

Figure 1:
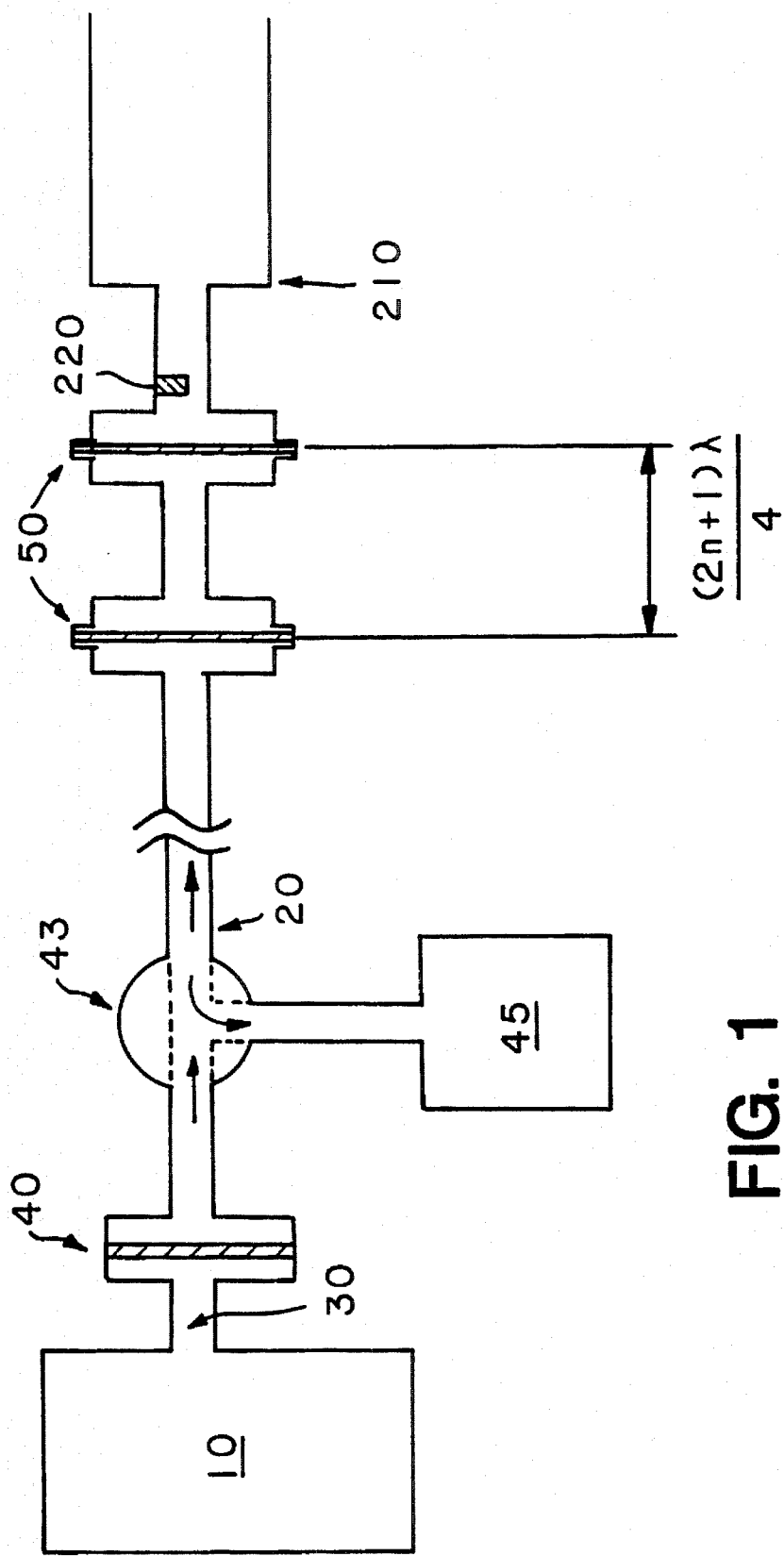
FIG. 1 depicts the microwave generator, waveguide windows and applicator system of the present invention.

In FIG. 1, the waveguide and applicator components of one example of the present invention are shown as, comprising microwave generator 10, from which a microwave of about 2,500 MHz in frequency is transmitted through waveguide 20 of a substantially rectangular design, (for example, based upon JIS standards WG430 for this frequency range). Other frequencies may be used, particularly those within the range of about 850 MHz to about 30 GHz, depending on the particular operational parameters and specific applications required. The waveguide is preferably made from a material which is durable, resistant to chemical attack and a good electrical conductor, such as nickel or stainless steel, and having in the most preferred embodiment a thin layer of gold plating 25 on the interior surface of the waveguide. Waveguide 20 is vacuum coupled to the microwave generator 10, and includes an output window 40, preferably made from alumina, located downstream from generator 10, such that a vacuum environment 30 exists within waveguide 20 from the microwave generator to an upstream side of output window 40.

Figure 2A:
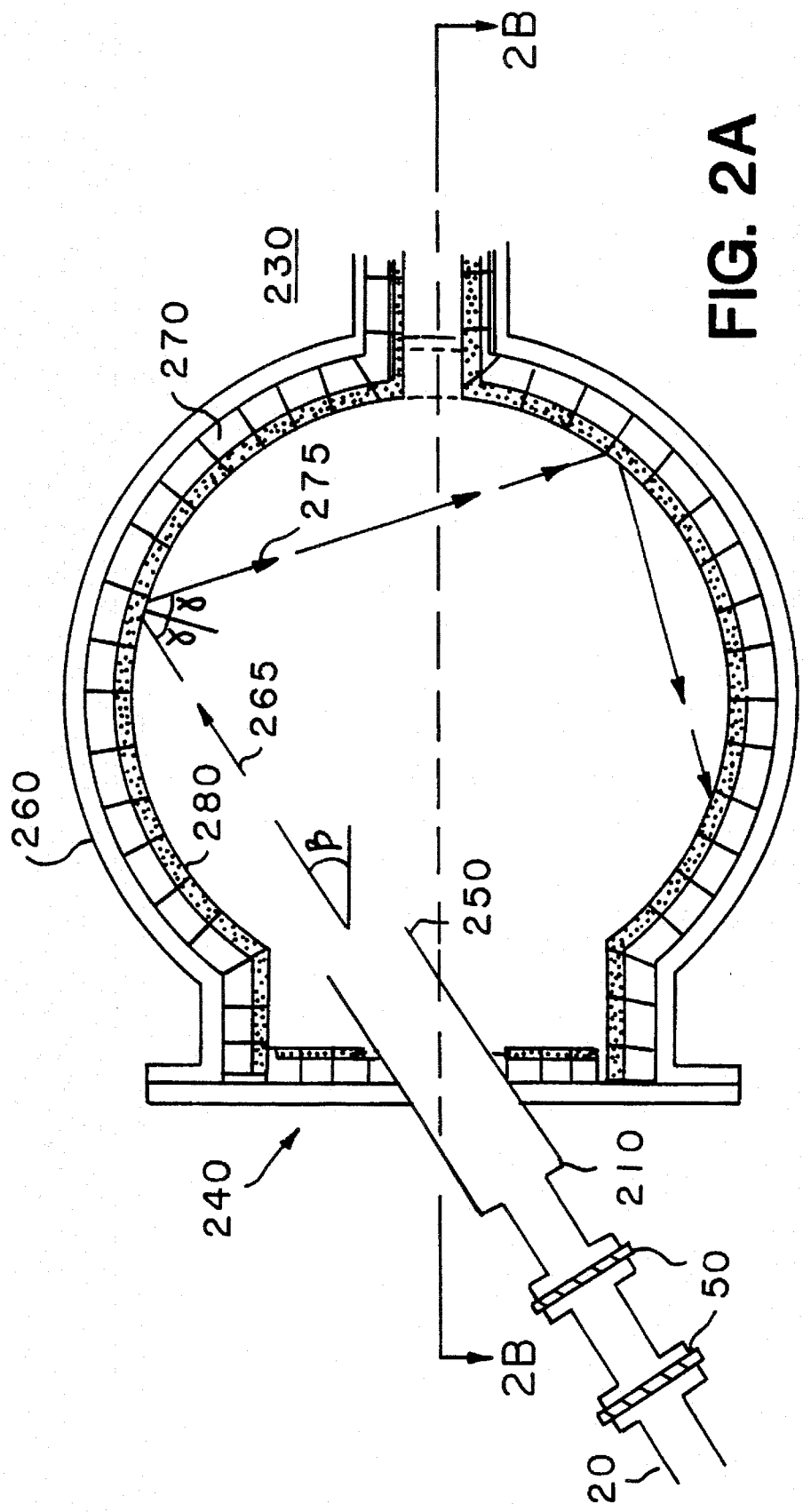
FIG. 2A is a plan view of the applicator waveguide of the present invention coupled to the reaction vessel, showing the launch angle of the microwave energy and its propagation in the "whispering gallery" mode.
Figure 2B:
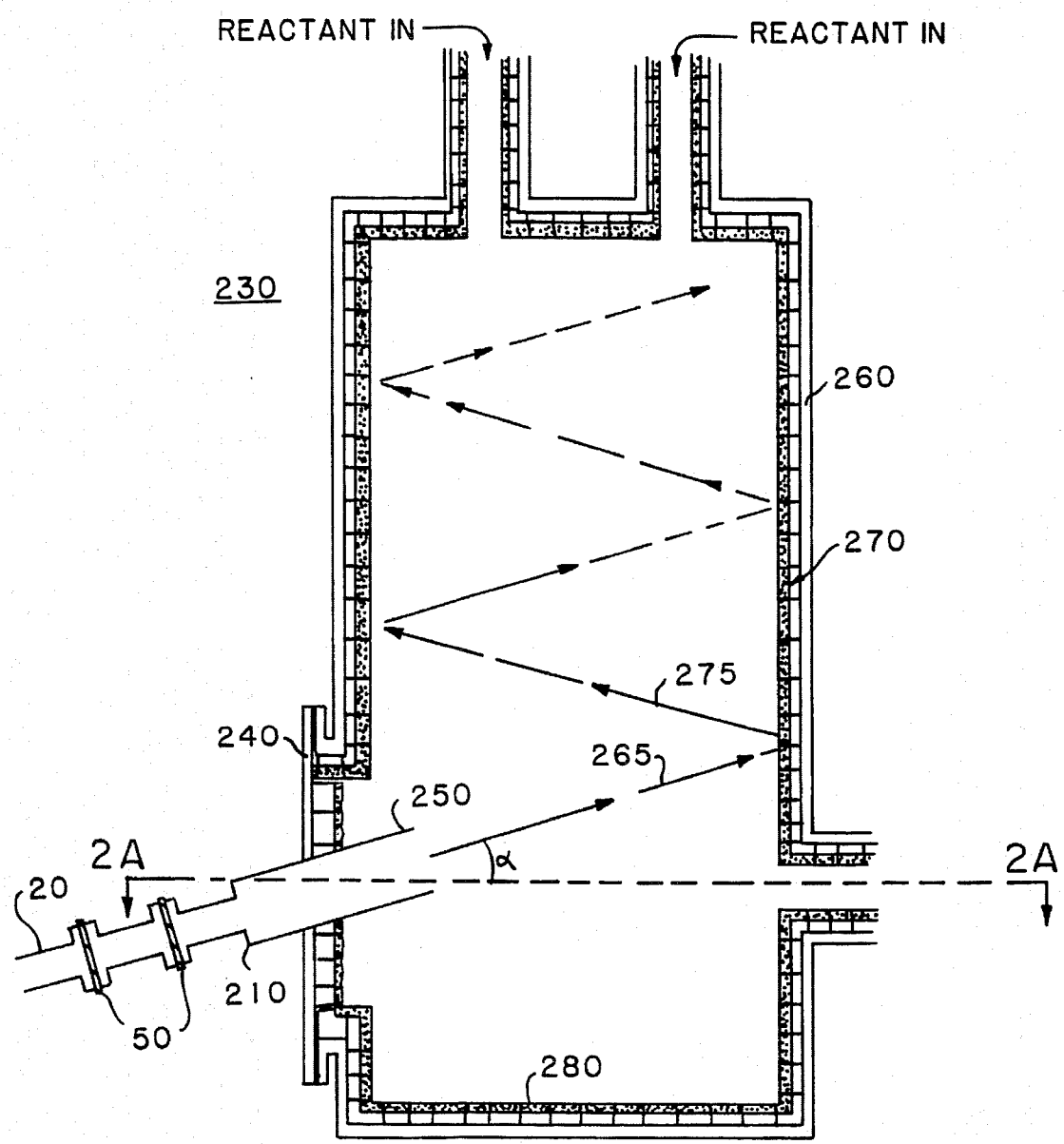
FIG. 2B depicts a sectional view of the applicator/reactor combination as described in FIG. 2A.

The microwave-energy exits output window 40 and continues to propagate laterally downstream to quartz windows 50, designed to isolate the microwave generator from the contents of the reaction vessel, shown as element 230 in FIG. 2A and 2B, while allowing highly efficient transmission of microwave energy. The dual window configuration, as depicted, is preferred for safety reasons. In the event of a failure of one window the escape of reactor material will be prevented by the second, upstream window, and detected by sensors (not shown) positioned in the interspace between the two windows. Referring to FIG. 3, a close up view of the quartz windows is disclosed showing quartz discs 60, positioned perpendicular to the longitudinal axis of rectangular waveguide 20, and mounted in short housing sections of circular waveguides 70 in a pill box configuration. Quartz is preferred for use as the disc material due to its high strength and good resistance to chemical attack, as well as its low coefficient of thermal expansion, giving quartz excellent resistance to thermal shock and differential heating.

In the depicted embodiment the two quartz windows are positioned in series, space an odd number of quarter wavelengths apart to aid in canceling reflections, with the space 80 within the rectangular waveguide section between the two pillboxes, filled with a dry inert or unreactive gas such as nitrogen. That portion of microwave energy which is reflected propagates back through rectangular waveguide 20 to waveguide isolator 43, which prevents feedback of the microwave to generator 10, by redirecting the microwave to load buffer 45. It will be recognized, however, by those skilled in the art that a single window may also be used as an alternative to this embodiment and other materials which exhibit dielectric properties equivalent to the quartz used for the disc elements in the embodiment depicted.

Figure 4A:
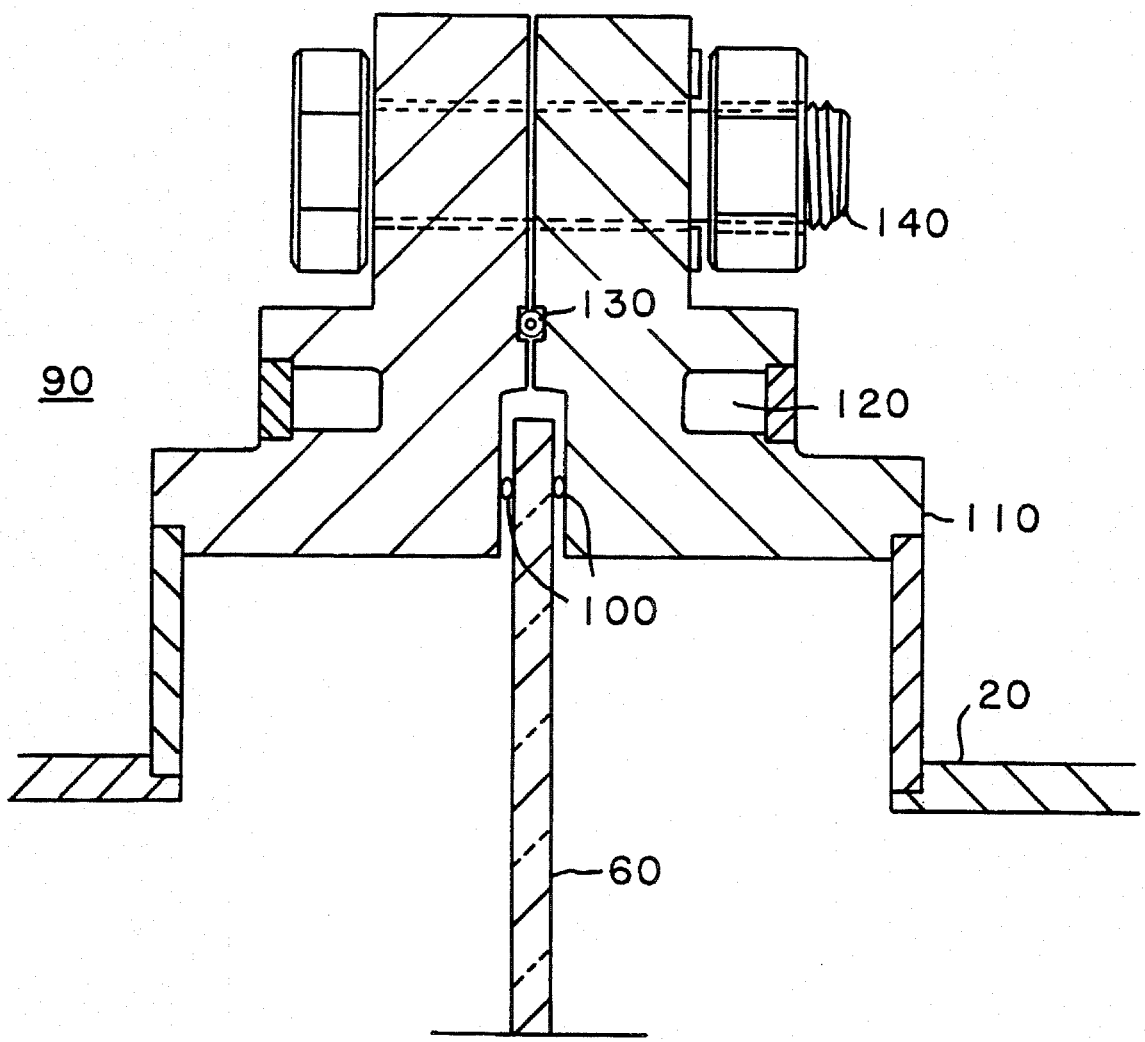
FIG. 4A is a further close up of the window sealing configuration of a first embodiment of the present invention.

The quartz discs 60 shown in FIG. 3, are preferably made from fused quartz, and hermetically sealed by sealing means 90 within pill box housing 70, close to the peripheral edge of the housing and in a manner which will not affect the transmission of microwave energy as it propagates through windows 50. Conventional sealing techniques, in which an alumina disc is metallized on its outer circumference and its surface is then brazed directly into the metal housing sleeve, cannot be readily utilized with material such as quartz because of the large disparity in the expansion coefficients of suitable structural materials and quartz. Therefore, to compensate for the expansion mismatch, disc 60 in one sealing embodiment of sealing means 90, is fitted with compression seal 100 on its plane surface, as shown on close up FIG. 4A. The compression seals are preferably an O-ring manufactured from a soft metal such as gold or the like, and are positioned between disc 50 and the metal flange section 110 of pillbox 70, which is kept cool by means of water channel 120. The flange element 110 and clamped into place using a conventional washer 132 and bolt 140 combination, or using convention welds.

Figure 4B:
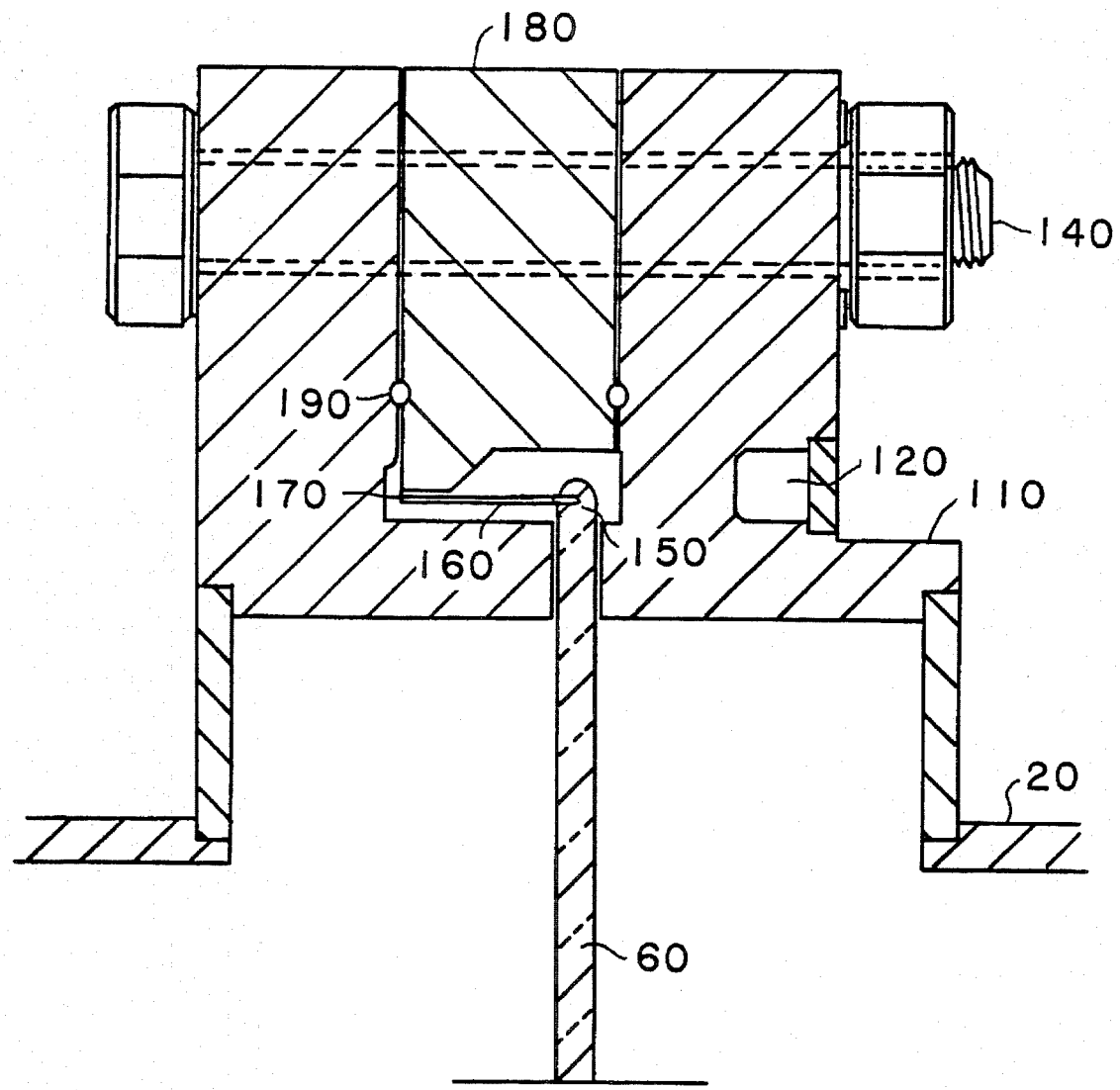
FIG. 4B is a second embodiment of the window sealing configuration of the present invention.

In an alternative embodiment, as set out in FIG. 4B, quartz disc 60 has a graded glass seal 150 applied along its peripheral edge. The glass seal provides a region of expansion coefficient transition which permits a conventional glass-to-metal sealing to a chemically resistant metal sleeve 160 such as plated molybdenum. Sleeve 160 is then welded at point 170 to a high vacuum flange 180 which is in turn bolted, via a UHV gasket seal 190 such as Conflat®, to the water cooled pillbox flange.

Figure 4C:
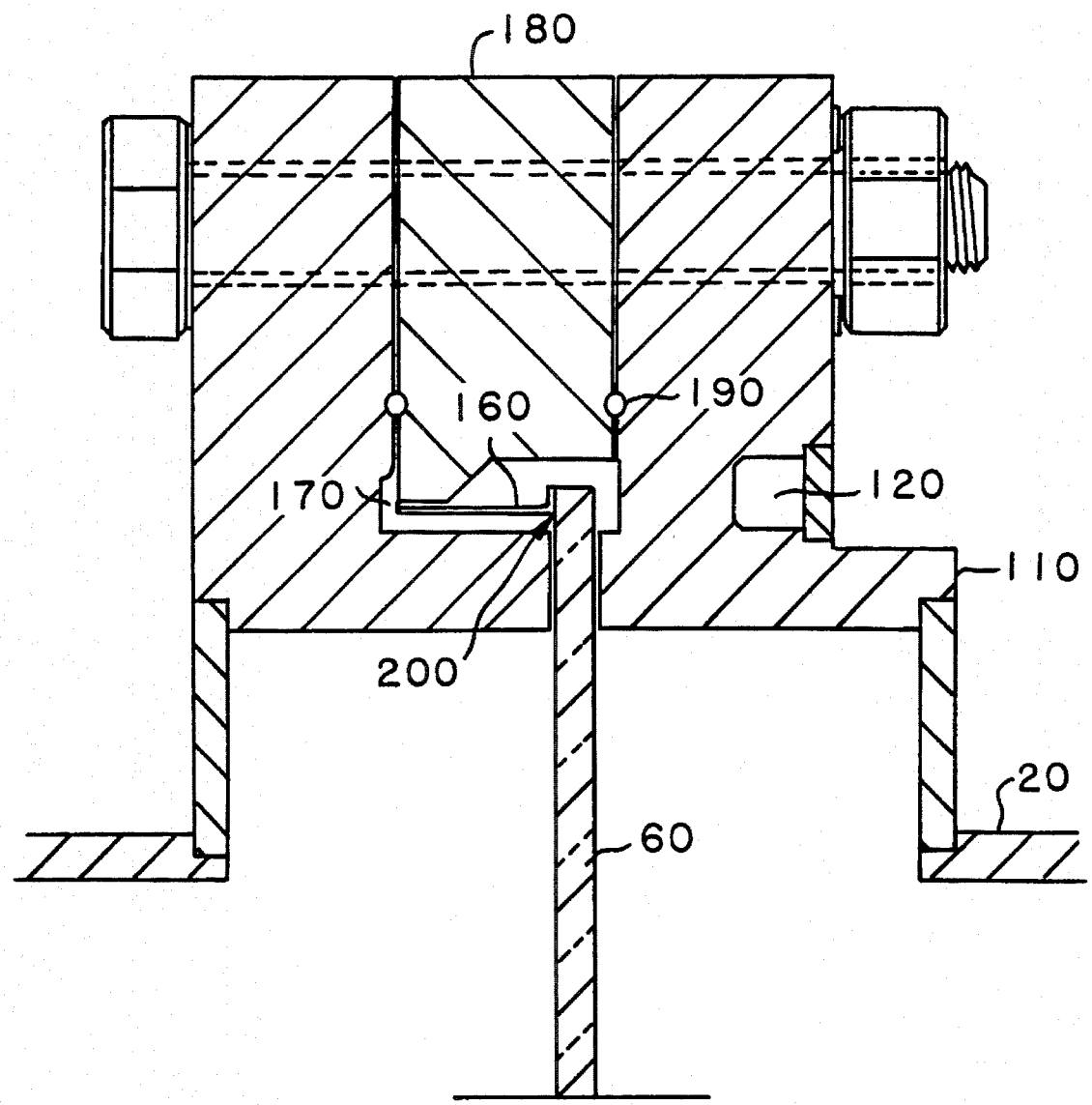
FIG. 4C is a third embodiment of the window sealing configuration of the present invention.

In still another embodiment, as set out in FIG. 4C, the quartz disc 60 is preferably made from crystal quartz, and is cut so that the high expansion coefficient direction lies in the plane of the windows. The disc is then expansion matched in one plane to a structural metal, such as stainless steel, to allow metal sleeve 160 to be attached directly to the planar surface of the disc 60 at its peripheral edge. Sleeve 160 is attached directly to the quartz surface of the disc by joint 200 which can be formed by suitable methods such as diffusion bonding or active metal brazing, or by first metalizing the crystal quartz with, for example, molybdenum/manganese, and then carrying out a conventional gold alloy braze in either a vacuum or hydrogen atmosphere. Metal sleeve 160 and the window assembly are joined by at point weld at point 170 to high vacuum flange 180 in a manner as provided in the previous embodiment, depicted in FIG. 4B.

Returning to FIG. 3, downstream of quartz windows 50, on the reactor side of the windows, the rectangular waveguide abruptly transitions to a circular waveguide applicator 210 having a larger diameter. This abrupt change causes an excitation of multiple microwave propagation modes in the circular waveguide, thereby improving the distribution uniformity of the microwave energy within the reaction vessel. Those skilled in the art will recognize that the change in waveguide diameter, for a circular waveguide, is a function of the cutoff frequency $f_{co}$, for the desired modes, for example, in the $TE_{11}$ mode, where $\lambda_{co}=1.7$ (alia). Information necessary for making calculations for the diameter required to transmit other, higher order modes and to for other waveguide geometries, in addition to circular configurations, is available from texts such as Fields and Waves in Communication Electronics, by Ramo, Whinnery and Van Duzer, published by John Wiley & Sons, Inc. Referring again to FIG. 3, a matching element 220, such as a post or an iris, is provided in the wall of the rectangular section of the waveguide to compensate for any mismatch at the transition and to prevent the microwave energy from being reflected at the transition and traveling back upstream along the waveguide and through the windows. In the event energy is reflected, isolation means 43 is provided, as previously discussed, to redirect the reflected energy.

Referring now to FIG. 2A and FIG. 2B, the circular waveguide applicator is shown both in plan and sectional views respectively, coupled to reaction vessel 230 of the type well known well known to those in skilled the art. The applicator is coupled via an existing inspection port or other existing aperture, by means of a modified cover plate 240, so that a short length of the terminus 250 of the circular waveguide protrudes into the reaction vessel. The applicator terminus should be positioned to allow the microwave to propagate, and the energy density to diminish, so that it is reflected at an opposing side wall, rather than initially impinging on a side wall adjacent the applicator. The circular waveguide applicator 210 is mounted, via cover plate 240, in a manner which introduces minimal perturbation of the vessel's interior, at an inclination angle $\alpha$ with respect to the lateral axis of the vessel designated by sectional line A—A, and angled at a position $\beta$ toward the side wall of the vessel, in a tangential configuration, with respect to the lateral axis. This configuration enables the microwave energy to be launched at an angle approximately tangential to the outer shell 260 of the reaction vessel, with a component of its direction vector along the vessel's longitudinal axis. The angles $\alpha$ and $\beta$ are determined as a function of the vessel geometry, such that the reflected microwave will not be reflected back toward the applicator as it propagates throughout the vessel.

The launched microwave wavefront 265 enters the reaction vessel and initially penetrates the vessel ceramic lining 270 until it reaches the inner surface of the outer metal shell 260, where the energy is internally reflected and propagates back through the ceramic lining. The reflected microwave 275 re emerges from the ceramic surface and re-enters the vessel, where it continues to penetrate and re-penetrate the ceramic liner, losing a percentage of its energy in the form of heat through each reflection, as it propagates around the interior of the reaction vessel in what can be construed as a whispering gallery mode, as the microwave is continually reflected, and to some extent scattered, by the metal wall.

The helical path of the launched microwave results in an upwardly propagating vortex of energy, that provides a very even energy distribution an reaction ceramic lining 270. The whispering gallery propagation that microwaves pass through the ceramic at differing points again and again until all the microwave energy is absorbed and converted to heat, thereby avoiding the formation of local regions of high field intensity which could cause hot spots. This procedure even works if only a few percent of the energy is absorbed on a single pass through the ceramic since almost no energy is reflected back into the applicator as a result of the applicator angled mounting In the preferred embodiment an electrically conductive refractory lining, such as carbon or carbon rich bricks, is used as an inner lining 280 with the ceramic liner 270 acting as an insulator interposed between the inner lining and the metal casing. As the microwave propagates in the above described manner, the energy is both reflected and absorbed solely by the carbon inner lining. The heat generated by the absorbed energy is retained in lining 280 and prevented from being dissipated by the insulation layer provided by ceramic lining 270. As a result, the vessel is heated more efficiently, and energy loss due to the microwave impinging on the outer metal casing is avoided. For this particular embodiment, a transition 210 in the wave guide diameter to excite multiple microwave propagation modes may still be used, but is not necessary for efficient heating due to the incorporation of inner lining 280.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An apparatus for heating material comprising a closed vessel for receiving the material and means for generating microwave energy, a waveguide operably coupled to said microwave generating means at a first end and having a means for exciting multiple microwave propagation modes in a second end, said second end integrally coupled to the closed vessel in an angled configuration with respect to the lateral axis of said vessel to induce a helical-type reflection of microwave energy which propagates throughout the closed vessel in a whispering gallery-type mode; and a microwave transparent isolation means operably interposed between said microwave generating means and said closed vessel, said isolation means comprising a housing and a microwave transparent barrier fixedly attached to said housing by a thermal expansion compensating seal.

2. The combination as provided in claim 1 wherein the means for exciting the multiple microwave propagation modes is an increase in diameter of the waveguide at said second end.

3. The apparatus of claim 2 wherein the cross-sectional waveguide at the first end is rectangular and at the second end is circular.

4. The apparatus of claim 2 or 3 wherein the increase in waveguide diameter is a function of cutoff frequency.

5. The apparatus of claim 2 wherein the second end is coupled to the closed vessel at a tangential incline angled configuration.

6. The apparatus of claim 5 wherein the second end of said waveguide is positioned within the interior of said closed vessel such that a launched microwave avoids initially impinging a sidewall of said vessel adjacent said second end.

7. The apparatus of claim 1 wherein the microwave transparent barrier is a quartz disc.

8. The apparatus of claim 7 wherein the quartz is fused quartz.

9. The apparatus of claim 7 wherein the quartz is crystal quartz.

10. The apparatus of claim 1 wherein the closed vessel is a reaction vessel including an inner electrically conductive refractory lining and an insulation lining subjacent said inner lining.

11. The apparatus of claim 10 wherein the inner lining is a carbon based material.

12. The combination of claim 1 wherein the vessel includes wall material for partially absorbing and partially reflecting the microwave energy which propagates through the vessel in the whispering gallery-type mode, the absorption of the microwave energy causing the vessel walls to be heated to a temperature to cause material in the vessel to be heated to a desired temperature.

13. The combination of claim 12 wherein the housing is metal and the barrier includes a dielectric plate that (a) is transparent to the microwave energy, (b) is exposed to high temperature resulting from heating of the vessel and the material therein, (c) exposed to corrosive gases in the vessel, (d) has a relatively low coefficient of thermal expansion and (e) is able to withstand the corrosive gases without substantial chemical and mechanical change, the plate being surrounded by the metal housing, the metal housing having a coefficient of thermal expansion substantially different from the dielectric plate, and the seal is between the dielectric plate and the metal housing for maintaining a seal between opposite sides of the plate and the housing throughout the temperature range experienced by the plate and the housing.

14. The combination of claim 1 wherein the vessel undergoes substantial temperature change and corrosive gases are therein, the housing is metal and the barrier includes a dielectric plate that (a) is transparent to the microwave energy, (b) is exposed to high temperature resulting from heating of the vessel and the material therein, (c) exposed to corrosive gases in the vessel, (d) has a relatively low coefficient of thermal expansion and (e) is able to withstand the corrosive gases without substantial chemical and mechanical change, the plate being surrounded by the metal housing, the metal housing having a coefficient of thermal expansion substantially different from the dielectric plate, and the seal is between the dielectric plate and the metal housing for maintaining a seal between opposite sides of the plate and the housing throughout the temperature range experienced by the plate and the housing.

15. The combination of claim 14 wherein the dielectric plate is made of quartz.

16. An apparatus for heating material comprising
a reaction vessel for receiving the material,
means for generating microwave energy having a frequency between about 850 MHz and about 30 GHz;
a waveguide having a first end of a first diameter, and a second end of a second diameter larger than said first diameter, said first end operably coupled to said microwave generating means and said second end integrally coupled to the reaction vessel in a tangentially angled configuration with respect to the lateral axis of said reaction vessel to induce a helical-type reflection pattern of microwave energy which propagates throughout the reaction vessel in a whispering gallery-type mode; and
a microwave transparent isolation means operably coupled between the waveguide and the reaction vessel, said isolation means comprising a housing and a dielectric material fixedly mounted in said housing, perpendicular to the longitudinal axis of the waveguide, by a thermal expansion compensating seal.

17. The apparatus of claim 12 wherein the first end of the waveguide is rectangular in cross section and the second end of the waveguide is circular in cross section.

18. The apparatus of claim 16 wherein the tangentially angled configuration is at an offset inclined angle with respect to the lateral axis of said vessel.

19. The apparatus of claim 16 wherein the reaction vessel further comprises an inner electrically conductive refractory lining and an insulation lining subjacent to said inner lining.

20. The apparatus of claim 16 wherein the first diameter and the second diameter of the waveguide are approximately equal.

21. The apparatus of claim 16 wherein the dielectric material is quartz.

22. The method of heating a reactor vessel using microwave energy, comprising the steps of
generating microwave energy;
exciting multiple propagation modes of said microwave energy;
directing said excited microwave energy into the reactor vessel at an offset, angled position relative to the lateral axis of said vessel to induce a helical-type reflection pattern propagating throughout the vessel in a whispering gallery-type mode.

23. The method of claim 22 wherein the excited microwave energy is directed at an offset, inclined, launch angle with respect to the vessel lateral axis.

24. The method of claim 23 wherein the offset angle avoids initially impinging a launched microwave on a sidewall of the vessel adjacent the location in the vessel where the energy is initially directed at the offset angled position.

25. A method of heating material in a reaction vessel having a wall with facing interior portions, the wall including microwave absorbing and reflecting material, comprising the steps of supplying a microwave energy beam to a first of said interior portions, the energy being supplied to the first portion at an angle so energy in the energy beam is partially absorbed by the wall at the first portion and is partially reflected from the wall at the first portion, the energy reflected from the first portion propagating to a second of said portions that faces the first portion, the energy propagating from the first portion to the second portion being partially absorbed and partially reflected at the second portion, the energy reflected from the second portion propagating to a third of said portions that faces the second portion, the energy propagating from the second portion to the third portion being partially absorbed and partially reflected at the third portion, all of said first, second and third portions being spaced from each other and being heated by the microwave energy absorbed thereby, the reflection and absorption of the energy being repeated for many additional different ones of said facing portions so the many additional different portions are heated by the microwave energy absorbed thereby, the energy being supplied to the first, second, third and many different portions for a sufficiently long period to heat the wall to a temperature to cause the material to be heated to a desired temperature.

26. The method of claim 25 wherein the vessel has a longitudinal axis, the microwave energy beam being directed at the first, second, third and many different portions so that the different portions are differentially spaced relative to each other along the longitudinal axis.

27. The method of claim 26 wherein the energy is scattered from the portions.

28. The method of claim 26 wherein the energy has a helical like path between the portions within the vessel.

29. The method of claim 25 wherein the microwave energy beam has multiple modes.

30. Apparatus for heating material comprising a reaction vessel for receiving the material, the reaction vessel having a wall with facing interior portions, the wall including microwave absorbing and reflecting material, a microwave feed for supplying a microwave energy beam to a first of said interior wall portions, the energy being supplied to the first portion on the interior wall at an angle so energy in the energy beam is partially absorbed by the wall at the first portion and is partially reflected from the wall at the first portion, the first wall portion and the angle of the energy beam being such that the energy reflected from the first portion propagates to a second of said portions that faces the first portion, the energy propagating from the first portion to the second portion being partially absorbed and partially reflected at the second portion, the energy reflected from the second portion propagating to a third of said portions on the interior wall that faces the second portion, the energy propagating from the second portion to the third portion being partially absorbed and partially reflected at the third portion, all of said first, second and third portions being spaced from each other and being heated by the microwave energy absorbed thereby, the reflection and absorption of the energy being repeated for many additional different facing portions on the interior wall so the many additional different portions are heated by the microwave energy absorbed thereby, whereby in response to the energy being supplied to the first, second, third and many different portions for a sufficiently long period the wall is heated to a temperature to cause the material to be heated to a desired temperature.

31. The apparatus of claim 30 wherein the wall portions are constructed and the microwave energy is such that the microwave energy incident on the wall portions is scattered from them.

32. The apparatus of claim 31 wherein the vessel has a longitudinal axis, the microwave feed being arranged so the angle of the energy beam is such that the first, second, third and many different portions are differentially spaced relative to each other along the longitudinal axis.

33. The apparatus of claim 30 wherein the vessel has a longitudinal axis, the microwave feed being arranged so the angle of the energy beam is such that the first, second, third and many different portions are differentially spaced relative to each other along the longitudinal axis.

34. The apparatus of claim 30 wherein the wall includes a ceramic cylindrical liner overlying a metal cylinder.

35. The apparatus of claim 30 wherein the wall includes an electrically conductive refractory cylindrical lining.

36. The apparatus of claim 30 wherein the wall includes an electrically conductive refractory cylindrical lining overlying a cylindrical ceramic liner, the ceramic liner overlying a metal cylinder.

37. The apparatus of claim 30 wherein the wall includes a metal cylinder.

38. The apparatus of claim 30 wherein the feed is arranged for supplying multiple modes to the interior of the vessel.

39. In combination a chemical reaction vessel, a microwave coupling circuit connected to the interior of the reaction vessel for supplying energy from a source of microwave energy to the interior of the vessel, the vessel being adapted to include materials that are heated to relatively high temperatures and produce corrosive gases and cause the vessel to have a wide range of temperatures from ambient to about the high temperature, the coupling circuit including a microwave window with a dielectric plate that (a) is transparent to the microwave energy, (b) is exposed to the high temperature, (c) is exposed to the corrosive gases, (d) has a relatively low coefficient of thermal expansion and (e) is able to withstand the corrosive gases without substantial chemical and mechanical change, the plate being surrounded by a metal housing having a coefficient of thermal expansion substantially different from that of the dielectric plate, and a thermal expansion matching seal between the dielectric plate and the metal housing for maintaining a seal between opposite sides of the plate and the housing throughout the temperature range experienced by the plate and the housing.

40. The combination of claim 39 wherein the dielectric plate is made of quartz.

41. The combination of claim 39 further including another microwave window in the coupling circuit between an end of the circuit adapted to be connected to the source and the window including the plate exposed to the corrosive gases.

42. The combination of claim 41 wherein the windows are spaced from each other by (2n+1) spaced from each other by (2n+1)

$$(2n+1)\frac{\lambda}{4},$$

where n is zero or a positive integer and $\lambda$ is the wavelength of microwave energy supplied to the circuit by the source.

43. The combination of claim 41 wherein the windows have substantially the same construction.

44. The combination of claim 41 wherein the microwave circuit includes a pressurized waveguide between the windows.

45. The combination of claim 41 wherein the waveguide between the windows is filled with a non-reactive gas.

46. The combination of claim 39 wherein the vessel has a wall with facing interior portions, the wall including microwave absorbing and reflecting material, the vessel and an end of the microwave coupling circuit in the vessel being arranged so a beam of the microwave energy coupled to the vessel interior is supplied to a first of said interior wall portions at an angle to the first portion so energy in the energy beam is partially absorbed by the wall at the first portion and is partially reflected from the wall at the first portion, the first wall portion and the angle of the energy beam being such that the energy reflected from the first portion propagates to a second of said portions that faces the first portion, the energy propagating from the first portion to the second portion being partially absorbed and partially reflected at the second portion, the energy reflected from the second portion propagating to a third of said portions on the interior wall that faces the second portion, the energy propagating from the second portion to the third portion being partially absorbed and partially reflected at the third portion, all of said first, second and third portions being spaced from each other and being heated by the microwave energy absorbed thereby, the reflection and absorption of the energy being repeated for many additional different facing portions on the interior wall so the many additional different portions are heated by the microwave energy absorbed thereby, whereby in response to the energy being supplied to the first, second, third and many different portions for a sufficiently long period the wall is heated to a temperature to cause the material to be heated to a desired temperature.

47. The combination of claim 46 wherein the vessel has a longitudinal axis, the microwave feed being arranged so the angle of the energy beam is such that the first, second, third and many different portions are differentially spaced relative to each other along the longitudinal axis.

48. The combination of claim 39 wherein the housing includes a slit receiving the peripheral portion of the plate, the seal being a compression seal between opposite faces of the peripheral portion of the plate and opposing adjacent faces of the slit.

49. The combination of claim 39 wherein the housing includes a flat surface substantially at right angles to and spaced from the plane of the plate and the seal includes a member extending between a peripheral portion of the plate and the flat surface at right angles to the plane of the plate to provide a region of thermal expansion coefficient transition between the housing and plate.

50. The combination of claim 49 wherein the plate has a substantially greater coefficient of thermal expansion in the plane of the plate than the planes at right angles to the plane of the plate.

51. The combination of claim 39 wherein the seal is arranged to provide a region of thermal expansion coefficient transition between the housing and plate.

52. The combination of claim 51 wherein the plate has a substantially greater coefficient of thermal expansion in the plane of the plate than the planes at right angles to the plane of the plate.

* * * * *